(12) United States Patent
Yahiro et al.

(10) Patent No.: US 8,315,912 B2
(45) Date of Patent: Nov. 20, 2012

(54) INTEGRATED SOLAR AGENT BUSINESS MODEL

(75) Inventors: Shinichiro Yahiro, Huntington Beach, CA (US); Mika Otomo, Huntington Beach, CA (US)

(73) Assignee: Sharp Electronics Corporation, Huntington Beach, CA (US)

(*) Notice: Subject to any disclaimer, the term of this patent is extended or adjusted under 35 U.S.C. 154(b) by 202 days.

(21) Appl. No.: 12/940,732

(22) Filed: Nov. 5, 2010

(65) Prior Publication Data

US 2011/0047048 A1   Feb. 24, 2011

Related U.S. Application Data

(62) Division of application No. 11/318,310, filed on Dec. 23, 2005, now Pat. No. 7,844,499.

(51) Int. Cl.
 *G06Q 30/00* (2006.01)
(52) U.S. Cl. .................................................. 705/26.1
(58) Field of Classification Search .................. 705/26.1
 See application file for complete search history.

(56) References Cited

U.S. PATENT DOCUMENTS

| | | | |
|---|---|---|---|
| 4,885,694 A | 12/1989 | Pray et al. | 364/464.01 |
| 5,260,883 A | 11/1993 | Wilson | 364/512 |
| 5,357,439 A | 10/1994 | Matsuzaki et al. | 364/468 |
| 5,550,742 A | 8/1996 | Furuya et al. | 364/449 |
| 5,550,746 A | 8/1996 | Jacobs | 364/479.01 |
| 5,694,552 A | 12/1997 | Aharoni | 395/237 |
| 6,003,012 A | 12/1999 | Nick | 705/10 |
| 6,009,406 A | 12/1999 | Nick | 705/10 |
| 6,052,699 A | 4/2000 | Huelsbergen et al. | 707/206 |
| 6,115,690 A | 9/2000 | Wong | 705/7 |
| 6,154,730 A | 11/2000 | Adams et al. | 705/35 |
| 6,377,937 B1 | 4/2002 | Paskowitz | 705/26 |
| 6,512,966 B2 | 1/2003 | Lof et al. | 700/291 |
| 6,546,535 B1 | 4/2003 | Nagao et al. | 716/11 |
| 6,571,149 B1 | 5/2003 | Hahn-Carlson | 700/216 |
| 6,671,585 B2 | 12/2003 | Lof et al. | 700/291 |

(Continued)

OTHER PUBLICATIONS http://www.solar-estimate.org/index.php?page=solar-calculator.*

(Continued)

*Primary Examiner* — Mila Airapetian
(74) *Attorney, Agent, or Firm* — Pillsbury Winthrop Shaw Pittman LLP

(57) ABSTRACT

A method of delivering a solar system and related services from a solar system vendor to a customer is provided. The method includes estimating the customer's solar system requirements, delivering the estimated requirements to the customer, providing a sales lead that includes the estimated requirements to a contractor, the contractor contacting the customer to perform a sales close, ordering the solar system products from the solar system vendor, and issuing a payment for the products to the solar system vendor. The method of delivering solar services further includes supplying a first set of solar system components from the solar system vendor and a second set of solar system components from a third-party vendor, configuring all or a portion of the solar system components in accordance with the solar system requirements, shipping the solar system to the customer's site, and installing the system on the customer's site. The method for delivering solar services further includes financing the solar system by providing a loan from a financial institution to the customer, providing periodic payments from the customer to the financial institution, and providing payments from the financial institution to the contractor and from the contractor to the solar system vendor. An optional network monitoring service may also be provided.

3 Claims, 7 Drawing Sheets

U.S. PATENT DOCUMENTS

| | | | |
|---|---|---|---|
| 6,775,595 B1 | 8/2004 | Yabutani et al. | 700/291 |
| 6,785,592 B1 | 8/2004 | Smith et al. | 700/291 |
| 6,813,525 B2 | 11/2004 | Reid et al. | 700/19 |
| 6,879,962 B1 | 4/2005 | Smith et al. | 705/22 |
| 7,398,778 B2 * | 7/2008 | Kaiser | 126/101 |
| 2001/0029471 A1 | 10/2001 | Ito | 705/26 |
| 2002/0010518 A1 | 1/2002 | Reid et al. | 700/31 |
| 2002/0032611 A1 | 3/2002 | Khan | 705/26 |
| 2002/0052801 A1 | 5/2002 | Norton et al. | 705/26 |
| 2002/0077922 A1 | 6/2002 | Srinivasan | 705/26 |
| 2002/0087234 A1 | 7/2002 | Lof et al. | 700/286 |
| 2002/0094081 A1 | 7/2002 | Medvinsky | 380/44 |
| 2002/0156698 A1 | 10/2002 | Machau et al. | 705/26 |
| 2002/0194145 A1 | 12/2002 | Boucher et al. | 705/500 |
| 2002/0198629 A1 | 12/2002 | Ellis | 700/286 |
| 2003/0040844 A1 | 2/2003 | Spool et al. | 700/286 |
| 2003/0040845 A1 | 2/2003 | Spool et al. | 700/291 |
| 2003/0041037 A1 | 2/2003 | Spool et al. | 705/80 |
| 2003/0061081 A1 | 3/2003 | Kellond et al. | 705/7 |
| 2003/0109949 A1 | 6/2003 | Ikeda et al. | 700/98 |
| 2003/0115103 A1 | 6/2003 | Mason | 705/16 |
| 2003/0120618 A1 | 6/2003 | Atil et al. | 705/500 |
| 2003/0126060 A1 | 7/2003 | Lof et al. | 705/36 |
| 2003/0197429 A1 | 10/2003 | Takehara et al. | 307/86 |
| 2003/0210562 A1 | 11/2003 | Takehara et al. | 363/24 |
| 2003/0213515 A1 | 11/2003 | Sano et al. | 136/255 |
| 2003/0218888 A1 | 11/2003 | Suzui et al. | 363/34 |
| 2003/0229526 A1 | 12/2003 | Gallacci et al. | 705/7 |
| 2005/0010334 A1 | 1/2005 | Yabutani et al. | 700/291 |
| 2006/0282356 A1 * | 12/2006 | Andres et al. | 705/35 |

OTHER PUBLICATIONS

National Renewable Energy Laboratory, Introduction to Photovoltaic (Solar Cell) Systems, obtained online on Apr. 22, 2005 from url: <http://www.nrel.gov/clean_energy/photovoltaic.html>.

Sharp Electronics Corporation, Sky Estimator, obtained online on Apr. 18, 2005.

Sharp Electronics Corporation, How Solar Works, obtained online on Apr. 18, 2005 from url: <http://solar.sharpusa.com/solar/how_solar_works/0,2464,1-1,00.html>.

Sharp Electronics Corporation, SSD Web, Apr. 26, 2000, Powerpoint Presentation.

* cited by examiner

INTEGRATED SOLAR AGENT BUSINESS MODEL

CROSS REFERENCE TO RELATED APPLICATIONS

This application is a Divisional of U.S. patent application Ser. No. 11/318,310, filed on Dec. 23, 2005, the entire contents of which is incorporated herein by reference in its entirety.

BACKGROUND

Solar systems provide an attractive "green" alternative to conventional electric power grids. Using the power of sunlight to generate electricity, solar systems provide a clean, safe, reliable, and efficient source of energy. In addition to these benefits, solar systems can provide customers with significant cost savings in the long run. As an incentive to install solar systems, government entities may provide rebates or tax deductions to customers who purchase and install solar systems.

The major components of a solar system are the inverter and solar modules. Solar modules are comprised a metal frame surrounding layers of glass, plastic, backing material and silicon cells, which collect the sun's energy. The solar modules are normally installed on a customer's rooftop where they receive maximum exposure to sunlight. The inverter receives direct current (DC) electricity from the modules and converts it into alternating current (AC) electricity for use in the home. Other components of a solar system include the mounting structure, which is used to affix modules on the roof, and an electric meter, which tracks power usage. Using these components, solar systems can be easily integrated into a consumer's existing home power grid.

The cost of energy combined with volatile energy markets has led many power consumers to seriously consider the alternative of solar energy. The clear benefits of solar energy have led many to wonder whether solar power systems can be installed in their homes or places of business. Despite this demand for solar systems, customers have faced a number of impediments in the process of obtaining accurate quotes, securing financing, dealing with government and regulatory issues, and ensuring that solar systems are delivered and installed in a competent and professional manner.

One impediment many customers face is where to turn for accurate, customized information on installation of solar systems. General information about solar systems is available, but customized information permits customers to better assess whether solar systems can be installed on their particular premises and within their budgets. Thus, one impediment is the cost and expense involved with obtaining accurate and customized quotes for installing solar systems, and for estimating and visualizing the benefits that result from installation. Customers may also hesitate over what they perceive to be the high cost of solar systems, believing that solar systems cannot fit within their budgets. For customers who receive accurate information about the cost and are convinced of the financial and environmental benefits of using solar energy, many will have difficulty paying cash for the entire cost of solar systems. Thus, obtaining financing is another impediment customers face. The environmental attributes and tax rebates given to customers by government and non-governmental entities are an important incentive for many customers. But understanding, managing, and benefiting from environmental attributes takes time and expertise that customers may not possess. This presents yet another impediment to the installation of solar energy systems.

Solar system vendors face their own unique challenges at various points along the supply chain, and in the marketing and distribution process. While solar system vendors manufacture the major components of solar systems, such as the module and inverter, other more standardized components must be sourced from third parties and configured before or during delivery and installation. Moreover, solar system vendors may not have a network of local employees with the expertise to install solar systems on customers' premises. The present invention relates to an integrated solar agent business model that effectively addresses these and other challenges faced by solar system vendors and their customers.

BRIEF DESCRIPTION OF THE INVENTION

Referring to FIG. 1, the integrated solar agent business model covers many important aspects of a solar system installation on the premises of a customer 165. The process begins with a customer inquiry 150 directed towards an aerial or satellite photo estimator 140. The aerial or satellite photo estimator is an Internet-based software application linked to a solar system vendor 170. The solar system vendor may be composed of various entities, such as a solutions and service provider entity, and a manufacturing entity. The aerial or satellite photo estimator takes as input various customer data, and provides as output quote based on customer input and other factors, including a aerial or satellite view of the customer's rooftop or the land. The rooftop or land view allows for a more accurate quote by taking into account factors relevant in a solar system installation but difficult for customers to assess on their own, such as the orientation and size of the rooftop or the land.

Using the quote generated by the aerial or satellite photo estimator, the customer decides whether he or she wishes to proceed. If the customer wishes to proceed, then a business to business (B2B) portal 170, which is also linked to the solar system vendor 170, provides a sales lead and computer aided design (CAD) data to a contractor 135. In addition, the B2B portal 170 provides operation support functions 190 to the contractor. The contractor then proceeds with a sales close 145 with the customer 165. After the sales close, the contractor places an order 105 with the B2B portal 170. The solar system vendor 170 provides and configures all or a portion of the solar system components in accordance with the customer's requirements. Any components not provided by the solar system vendor are provided by one or more balance of sale (BOS) vendors 121 by means of a configure to order (CTO) procurement method 131. During the CTO procurement method, components of the solar system may be procured and assembled and configured by the BOS vendors and the solar system vendor. This configuration and procurement will preferably occur on the solar system vendor's site prior to shipment to the customer's premises for installation by the contractor. The solar system is delivered 151 from the solar system vendor 170 to the customer 165 or to the contractor 135, whereupon the contractor 135 proceeds with installation 155 of the system on the customer's premises.

The end user 165 may finance the solar system through a financing service 175 offered by a financial institution 185. The financing service provides for payment by the financing institution to the contractor 135. The financing institution, in turn, receives payment from the end user in the form of periodic loan payments 101. Thus, the end user may finance the purchase of the solar system. In one embodiment, the financial institution may offer financing to the solar system vendor 170, taking a government rebate as a collateral. By doing this, the solar system vendor will have the benefit of cash flow, which will enable the vendor to pay manufacturers on any accounts payable.

Some government entities may provide customers with environmental attributes, which may include Renewable Energy Credits (RECs), Emissions Rights, or other attributes, as an incentive to purchase and install solar systems. In one embodiment, the solar system vendor 170 may make an offer 141 to the customer to provide a rebate 191 in exchange for a transfer of the environmental attribute. If accepted by the customer, the environmental attribute is transferred 161 from the customer 165 to the solar system vendor 170. The solar system vendor may in turn transfer the environmental attribute to a utility company 181 in exchange for a payment 195 made to the solar system vendor 170.

An optional network monitoring system provides information about the power output, power input, error messages, and status of the system. The network monitoring system connects to the inverter and includes a monitoring server and a monitoring client. The optional network monitoring function may be provided in exchange for the transfer of environmental attributes to the solar system vendor.

Events and processes in this business model need not take place in any particular order, unless otherwise specified.

DETAILED DESCRIPTION

Figure 1:
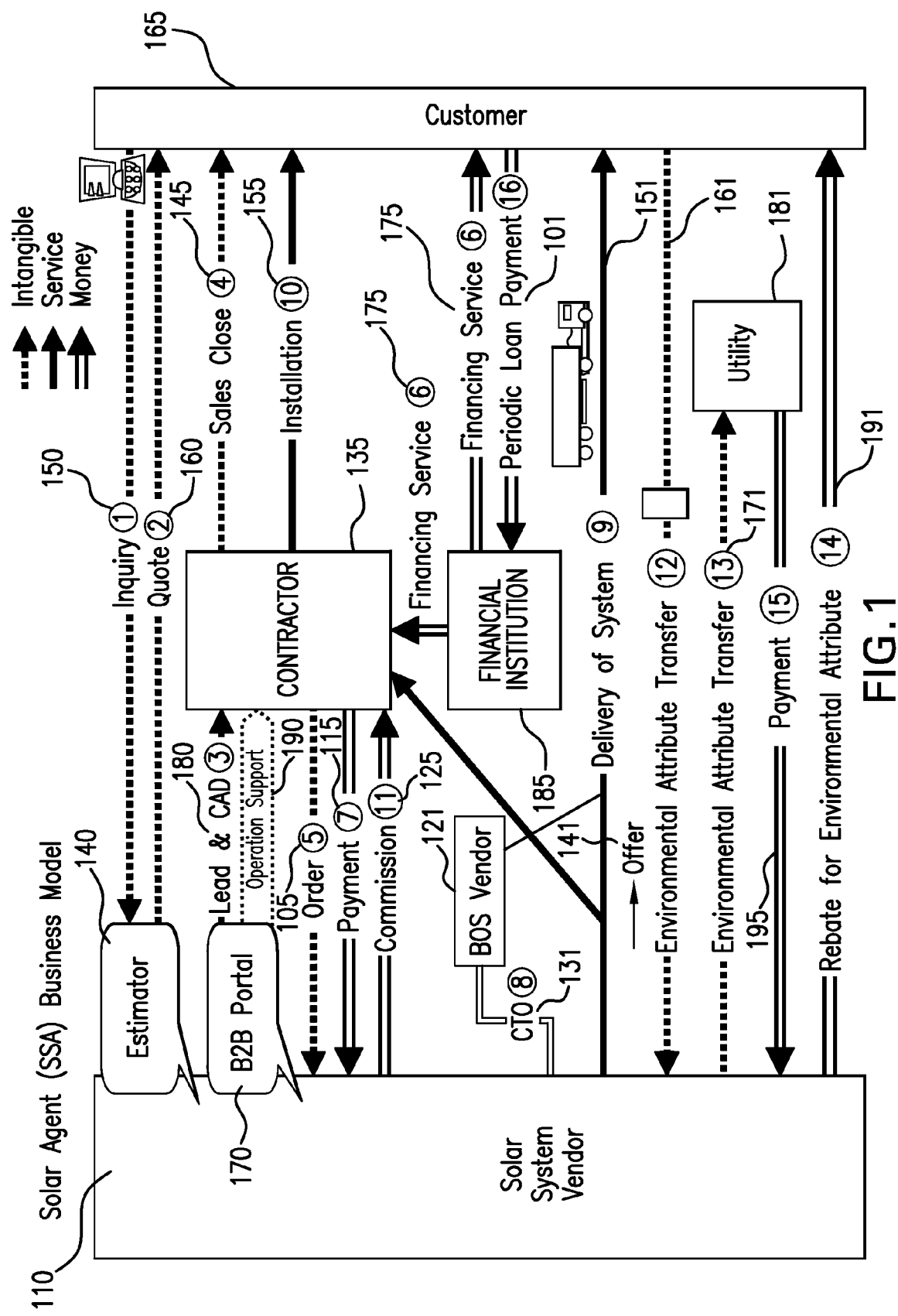
FIG. 1 shows an overview of the solar agent business model.

The estimation begins when the customer makes an inquiry through web browser software which connects to an aerial or satellite photo estimator application. The aerial or satellite photo estimator uses aerial or satellite photo data to provide a more accurate quote. First, the customer ensures that his or her home is in the aerial or satellite photo estimator service area. For this purpose, a map may show the geographic area where the aerial or satellite photo estimator service is available. The map can be at varying levels of detail depending on the size of the service area. For example, the service area might encompass cities within a county, counties within a state, one or more states, or any other geographic area where service may be provided. Alternately, the aerial or satellite photo estimator may verify availability by the customer's Zip (postal) code.

Upon verifying that service is available, the customer enters further information, which may include the customer's average electric bill, name, address, telephone number, and email address. For the purpose of facilitating and verifying the accuracy of the customer's information, the aerial or satellite photo estimator application may automatically fill in the city and state based on the customer's zip code, if already entered by the customer.

The customer information may be obtained in any order. For example, the customer's average electric bill may be obtained when verifying that the customer's home is in the aerial or satellite photo estimator service area. Furthermore, the information may be verified, for example, by having the customer re-enter his or her email address. Verification of the customer's address, phone number, zip code, or other information may take place on the server.

One form of verification is an aerial or satellite photo image of the customer's premises allowing the customer to verify the address. A flag, crosshairs, or other marker identifying the customer's premises can be superimposed on the aerial or satellite image to pinpoint the exact location of the premises. The aerial or satellite image might contain images of the customer's premises, as well as nearby streets, intersections, landmarks, public areas, vegetation, commercial or residential buildings, or other information that allows the customer to verify that the general location of the premises shown in the image is correct. This image of the customer's premises is obtained from a third-party database. The customer may also zoom in or out on the image to obtain a better view. If incorrect, the customer may remove the flag and place it on another premises. If correct, the collected data and image information is stored for processing of the quote.

Based on the information provided by the customer, including the customer's address and the amount of the customer's average electric bill, the estimator can be used to provide a rough estimate of the cost of a purchasing and installing solar system that fits the customer's home. The customer information may be used in various ways when computing the quote. It will be possible to determine how many solar modules are needed based on the customer's power usage. Layout of the solar modules can be determined based on the size and orientation of the customer's roof, which can be determined from the aerial or satellite image. For example, variables in determining the quote might include south-facing installation area of the customer's roof and yearly electricity bill payment.

In addition to customer information, the quote will also be based on other factors, such as the cost per kilowatt-hour in the customer's regional utility company (used to determine electricity usage from the customer's electricity bill payment), a standard cost of solar modules per watt, installation costs, or other expenses. Daily peak electricity requirements can then be computed and combined with the standard cost per watt for the solar modules. For example, if the customer's electricity bill is $1200 per year, and the cost of electricity is $0.16/kwh, then the customer uses 7500 kwh per year.

It should be understood that the quote may be a rough estimate of the actual cost of a solar system. The actual cost may vary from the estimate. The quote may provide a substantially accurate and detailed summary of the costs and benefits of a solar system, customized to the individual consumer.

The quote is provided to the customer in the form of a proposal. The customer may download the proposal from a web site. The proposal provides general information about solar systems, as well as information specific to the customer. The general information may include basic information about solar energy, such as the reduction in carbon dioxide emissions, the economics of how using solar energy can lower the customer's monthly electricity bill, and a brief overview of the main components of a solar system. Information about the components of a solar system may include specific product and warranty information. General information may also include trends in the cost and consumption levels of electric power, which may be customized to the customer's state or locality, and information about how a solar system can increase the resale home value.

The general information may also include information about installation of the solar system, as well as information about and the independent contractor who will perform the installation. For example, installation may require two kinds of contractor work: mounting of the solar modules to the customer's roof, and electrically connecting the solar modules, inverter, meter and other electrical components. Further information about the installation procedures may also be given, including the roles of the contractor who will perform the installation. These roles may include obtaining installation approval from a homeowner's association, obtaining any necessary building permits, interacting with the state energy commission in obtaining any applicable rebates, interacting with the customer's utility company, concluding the contract with the customer, obtaining delivery of the solar system, and installing the system on the customer's premises.

The proposal may also include one or more customized sections that are generated based on the data the customer entered in the inquiry stage. For example, a rooftop configuration shows the aerial or satellite photograph of the customer's premises and surrounding area. From the rooftop configuration, a number of computer aided design (CAD) views of the customer's premises are generated. The CAD views are oriented in general directions, and may show, for example, aerial or satellite top views, and views from the north, south, east or west. From the CAD views, a concept drawing of the solar module installed at the customer's house is provided. The concept drawing shows the layout of solar modules on the rooftop of the customer's premises, and also shows an estimate of the total generating capacity of the solar system in kilowatts of AC power. The concept drawing will not always match the exact shape of the customer's roof, and vent holes or other obstructions on the customer's roof may not allow the solar module to be installed. However, the concept drawing would typically depict a substantially accurate layout of the solar modules tailored to the image of the customer's roof shown in the aerial or satellite image. To provide more accuracy, the customer has an opportunity to later verify the final layout after an on-site visit by a contractor.

The proposal may further provide an estimate of variables based on information provided by the customer. These variables include the customer's city, utility company, electricity rate, electricity bill, system size, and direction for facing the solar modules that will provide the optimal solar generation capacity. Other useful information that might be provided in the proposal includes estimated power consumption trends and money savings based on the recommended system. Money savings can be presented as estimated savings in the electric bill, both by percentage and dollar amount. Energy savings can be provided as a percentage based on the total amount of energy consumed over a period, such as a year. Daily power consumption and generation may be contrasted. Typically, power generation will be highest in the summer months when there are more hours of sunlight in a day. The customer may be provided with one or more graphs showing the estimated monthly power consumed and purchased after the solar system is installed. This would allow the customer to visualize the benefits of installing the solar system. Power generation data may be computed based on third-party software products which may aggregate data in various geographic areas within a state.

Of course, these estimates will be based on an assumption that the customer's annual or monthly power consumption does not change in the first full calendar year following purchase and installation of the solar system. In practice actual power consumption will vary based on any lifestyle changes or the time of the year. Likewise, power generated by the solar system may vary based on the season or weather patterns of a given year. Accordingly, the estimate will not be a precise guarantee of the potential cost savings, which may vary based on these or other factors.

To the customer, the energy savings will represent part of the value of the solar energy system. Another value of a solar system is the environmental benefit. This can be estimated in pounds of carbon dioxide emissions that would be released if the energy provided by the solar modules had been generated by conventional means. To assist in visualization of these benefits, the customer may be provided with other metrics. These metrics might include the square footage of trees that would be required to offset the equivalent amount of carbon dioxide emission, and the number of miles that can be driven with a volume of gasoline that would emit the equivalent amount of carbon dioxide being saved. The estimated environmental impact, if provided, may create an incentive for some customers.

The approximated system cost includes the cost of the solar system products, labor, and tax. The products may be itemized by system components such as modules, inverter, or other products such as mounting tools, mounting structures such as aluminum rails, and other hardware that might be provided by BOS vendors. The system cost may also show the number of solar modules, as recommended in the concept drawing. Other additional costs may be shown in the estimate as well. These additional costs might include electric work, and costs associated with the height, pitch, and material of the roof.

Some states may provide rebates or tax credits to those who purchase solar energy systems. Thus, the system cost may be lowered through rebates and tax credits. The rebates can be calculated based on the number of kilowatts generated by the solar system. The tax credits can be calculated by a percentage of total system cost. The proposal can estimate these tax credits and rebates and subtract them from the total system cost to calculate a net system cost. The net system cost is the cost to the consumer after deducting the rebates and tax credits.

The proposal is based on the customer's web browser input in conjunction with the aerial or satellite image. The intent of the aerial or satellite photo estimator is to provide an accurate but inexpensive first quote to customers who show an initial interest. This group of customers will include those who decide, for whatever reason, that the solar program is not advantageous to pursue at the time. For these customers, cost savings for the solar system vendor may be achieved by keeping the initial quote inexpensive, yet accurate enough for the customer to meaningfully evaluate his or her initial interest in the solar system in light of the additional information provided in the initial proposal.

For other customers, the proposal will confirm their interest in installing a solar system. For these customers, an even more accurate quote may be obtained through a visit to the customer's premises by a local contractor. The local contractor is able to view the customer's premises directly and assess any additional costs or reductions that become apparent upon physical inspection. The local contractor also closes the sale and arranges for installation.

In one embodiment, the integrated solar agent business model provides products through the configure to order procurement system, provides sales leads for customers that have already expressed an interest in solar systems, and offers a web platform for training, support, ordering, and communications services. Cost savings to contractors may be achieved through the solar agent business model. Optionally, contractors may enjoy these benefits and gain a competitive edge through a franchise relationship with the solar system vendor.

After receiving a satisfactory quote, customers who are homeowners may finance the solar system at the time of installation though a solar loan program secured by home equity. The loan is then repaid over time through monthly payments, and the customer need not pay any money out of pocket at the time of purchase. This long term financing structure parallels the cost savings realized by solar systems, which is often spread over a number of years as the customer makes lower utility payments. This financing structure, if utilized, may allow more homeowners to take advantage of the benefits of solar power by making the systems affordable to those who would not otherwise be able to pay for the solar system.

Figure 2:
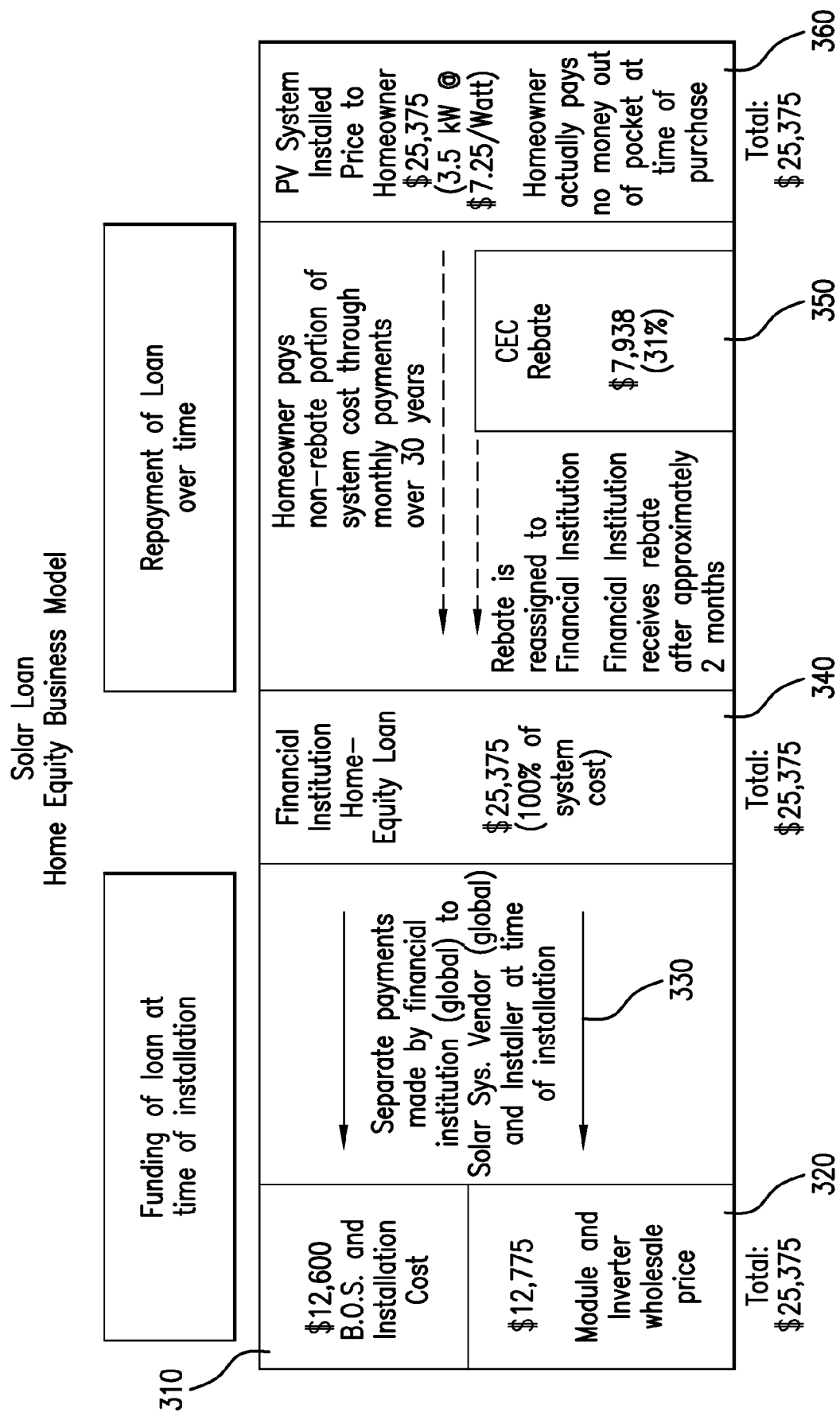
FIG. 2 shows the solar loan home equity and vendor financing business model.

Referring to FIG. 2, the illustrated solar system is financed through a third party financial institution 340. The financial institution may be a bank, credit union, or other institution capable of extending credit based on home equity.

The total cost 360 was previously determined by the quotes given to the customer. The total cost may be adjusted to account for other factors not considered when determining the final quote, such as fluctuations in interest rates, change in price of raw materials or system components, and financing charges. This list is not exclusive, and other changes to the final system cost may be made and agreed upon with the customer.

A state energy commission rebate 350 may be assessed at the time of installation and also deducted from the customer's total system cost 360 for the purposes of determining the total amount to be financed. The rebate may be set on a per-watt basis or a certain percentage of the total system cost depending on the system size. For example, the rebate might be 31% of the total system cost, representing significant savings to the customer and an additional incentive to install a solar system. In some states, the rebate may be initially assigned by the government agency to the customer, who agrees to re-assign it to the financial institution in exchange for a reduction in system cost. The financial institution might reduce the system cost by less than the amount of the CEO rebate to account for financing or other fees. The financial institution receives the rebate after a period of time, such as a number of months. For example, the rebate might be received two months after it is filed.

In some states, the utility may pay a rebate to the end user and the environmental attribute is retained by the utility. Environmental attributes may be RECs, Emissions Rights, or other attributes. In this case, the customer who purchases the solar system may never have ownership of the environmental attribute because the utility rebate serves as the incentive. In other states, the environmental attribute will be assigned to the end user, and may be reassigned to the solar system vendor, who may aggregate and sell the environmental attributes to the compliance or voluntary market.

At the time of installation, the financial institution makes separate payments to the vendor 320 and installer 310. Separate payments reduce overhead for vendors that rely on local contractors to perform installation and to purchase the BOS materials. Payment to the vendor covers the cost of solar modules, inverters, and other appliances that are supplied to the contractors. The financial institution then receives monthly or other periodic payments from the consumer until the solar system and any finance charges are paid in full.

Using the quote generated by the aerial or satellite photo estimator 140, the customer decides whether he or she wishes to proceed with obtaining more detailed information about a solar system, and possibly install such a system on his or her premises. The contractor 135 is involved directly with the customer at this stage. After obtaining all necessary information from the B2B portal, the contractor proceeds with a sales close 145 with the customer 165. As part of the sales close, the B2B portal 170, which is also linked to the solar system vendor 170, provides a sales lead and CAD data to a contractor 135. The sales lead data provided to the contractor may include the proposal. The customer 165 may confirm interest by contacting the solar system vendor 170, or the solar system vendor or contractor may contact the customer as a follow-up to providing a quote. Sales lead and CAD data may be provided to the contractor in the form of the proposal discussed above with reference to the customer quote.

Figure 3:
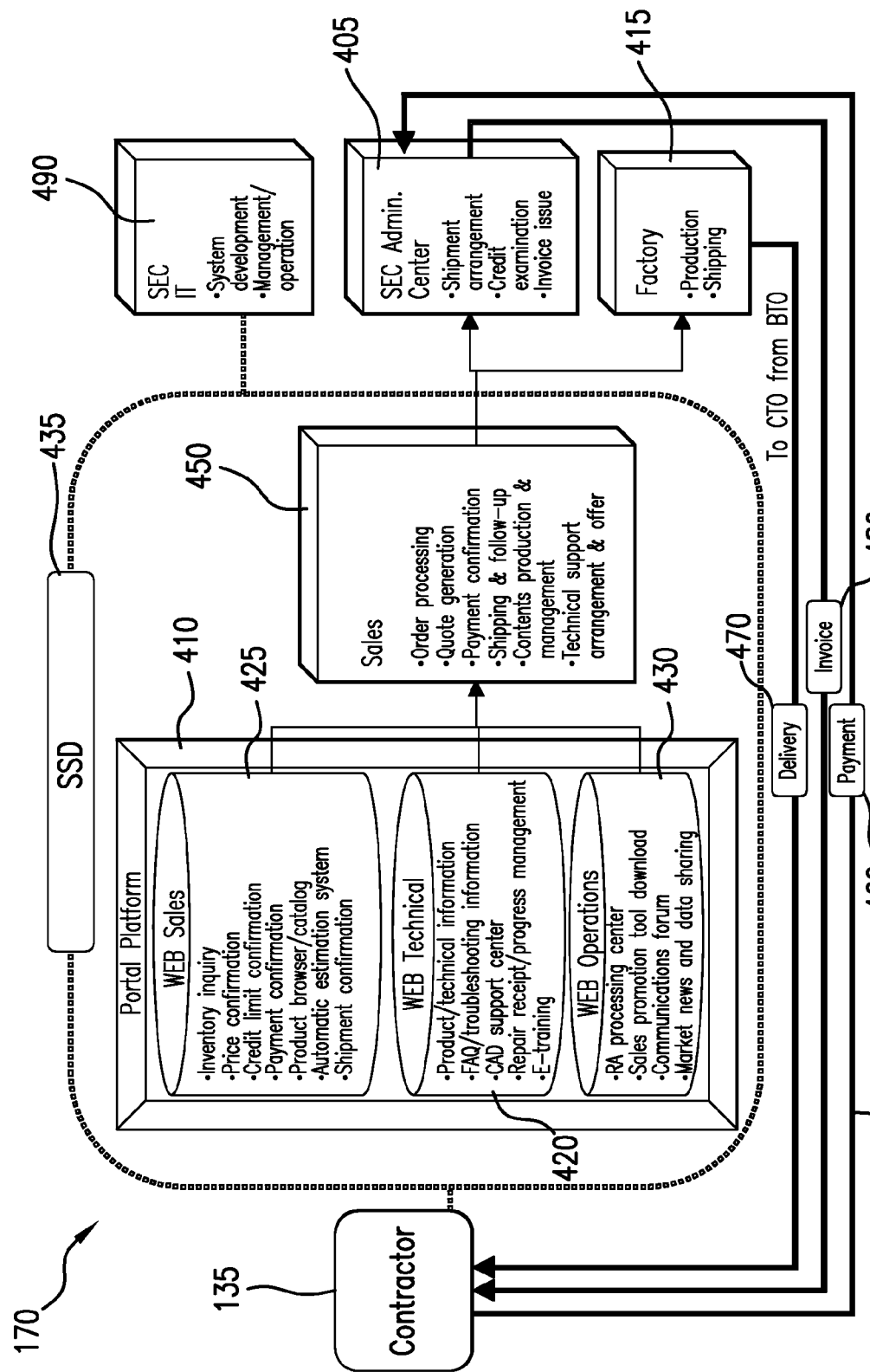
FIG. 3 shows the business to business portal.

With reference to FIG. 3, the B2B portal 170 provides a variety of support services to the contractor. The B2B portal may be built on a third-party logistics software package. A portal platform 410 contains three web-based service platforms: web sales 425, web technical 420, and web operations 430. Web sales service platform 425 responds to customer inquiries into inventory, price, products and orders. Product information may be provided in the form of a browser or catalog. In addition to inquiries, the web service platform 425 may also provide sales support functions such as credit limit confirmation, payment confirmation, online ordering systems, and shipment confirmation.

The web technical service platform 420 provides technical support functions for both solar products and the marketing, distribution, and installation process. In this sense, the web technical service platform 420 may provide information to different groups. For customers, it provides product and technical information about the solar systems, as well as information on environmental attributes. For contractors or employees of the solar system vendor, it can provide frequently asked question (FAQ) or technical information, a CAD support center for creating, evaluating and interpreting the quotes or proposals, repair receipt or progress management, and online training (also called "e-training"). Any of this information may be provided to customers, contractors, solar system vendor employees, or other groups as necessary to provide support.

The web operations service platform provides operations support functions, including a return authorization (RA) processing center, sales promotion tool download, communications forum, and market news and data sharing. This information may be useful for marketing, back-end sales or distribution support, customer research, investment, or other purposes. For example, a communications forum may be created to allow contractors located in diverse areas to gather and share information about solutions to common problems they face. Sales promotion tools may be provided to help contractors with the sales close 145. Market news and data sharing can be a valuable clearinghouse for information on regulatory or market updates relevant to solar systems.

The portal platform 410—including the web sales service platform 425, the web technical service platform 420, and the web operations service platform 430—interfaces with a solar system vendor sales unit 450. The solar system vendor sales unit provides a seamless sales-based interface to some of the services provided in the web sales service platform. It also provides an interface between the web sales service platform 425 on the one hand, and the administrative center 405 and factory 415 on the other. The solar system vendor sales unit 450 is necessary to provide added security, increased priority, or other necessary support to sales functions. Thus, order processing, quote generation, and payment confirmation receive additional support in the solar system vendor sales unit 450. The solar system vendor sales unit 450 also provides shipping and customer follow up, contents production and management, and offer and arrangement for technical support.

Together, the portal platform 410 and solar system vendor sales unit 450 comprise a solar solutions group 435. The solar system vendor unit 450 interfaces with the contractor 135, solar system vendor IT unit 490, solar system vendor administration center 405, and a factory 415. Through this interface, the solar system vendor unit 450 provides sales, technical and operations support. The solar system vendor IT unit 490 performs system development, management, and operation functions. The solar system vendor admin center 405 provides shipment arrangement, credit examination, and invoice issue functions. In particular, invoices issue from the solar system vendor admin center 405 to the contractor 135. As discussed above, the contractor orders through the B2B portal. As part of the ordering process, the contractor receives an invoice from the solar system vendor admin center 405, which is part of the B2B portal 170. The contractor receives payment 115 from the financial institution 185, which allows the contractor, in turn, to remit payment to the solar system vendor admin center 405. With reference to FIG. 1, the solar system vendor 170 pays a commission 125 to the contractor 135. Referring now to FIG. 3, the factory 415 provides production and shipping functions. In particular, the factory delivers the products to the contractor 135, optionally in a build to order (BTO) and configure to order (CTO) process. The process of delivering an invoice, delivering the product, and making payment comprises the operation support functions 190 of the B2B portal. The operation support functions may be carried out in any order. For instance, payment need not necessarily be made prior to delivery of the products to the contractor.

With the aid of the operation support functions 190, after the sales close 145, the contractor places an order 105 with the B2B portal 170. The solar system vendor 170 provides and configures all or a portion of the solar system components in accordance with the customer's requirements by means of a configure to order (CTO) procurement method 131. Any components not provided by the solar system vendor may be provided by one or more balance of sale (BOS) vendors 121, which may also be provided by means of the CTO procurement method 131. During the CTO procurement method, components of the solar system may be procured and configured by the solar system vendor. This configuration and procurement will preferably occur on the solar system vendor's site prior to shipment to the customer's premises for installation by the contractor. The CTO procurement method offers speed and cost advantages as the solar system customized to the customer's specifications can be quickly assembled by specialists at the solar system vendor. Following configuration, the solar system is delivered 151 from the solar system vendor 170 to the customer 165 or to the contractor 135, whereupon the contractor 135 proceeds with installation 155 of the system on the customer's premises. Following installation, the contractor receives a commission from the solar system vendor.

Figure 4:
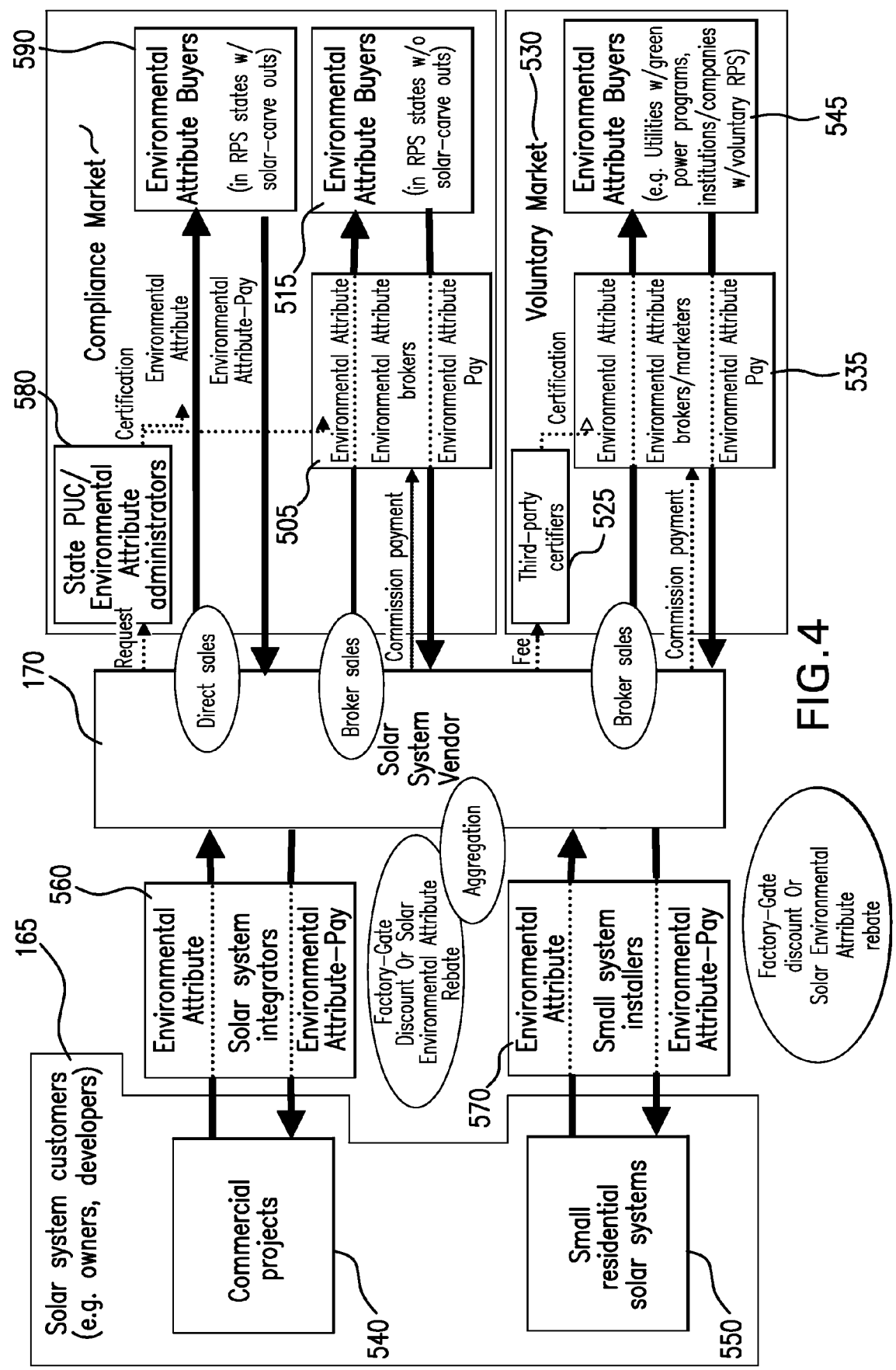
FIG. 4 shows the environmental attribute participants and business model.

FIG. 4 shows the environmental attribute unit of the solar agent business model. This unit is optional in states where environmental attributes are not given directly to customers. For example, in some states, rebates are provided to the customer and the environmental attribute is given directly to the utility. The environmental attribute unit will, therefore, typically be applied in those states where the environmental attribute is transferred to the customer and may be aggregated by the solar system vendor.

Customers 165 systems include both commercial projects 540 and small residential solar systems 550. In one embodiment, the interface between the customer and the solar system vendor 170 involves a transfer of the environmental attribute from the customer to the solar system vendor, and a payment from the solar system vendor to the customer. The payment may be in the form of a factory-gate discount, or a solar environmental attribute rebate. However, some aspects of the interface may vary depending on what kind of system the customer is installing. For commercial projects 540, the interface would typically involve solar system integrators, whereas for small residential solar systems, the interface would typically involve small system installers. Solar system integrators handle commercial systems (usually over 30 kW) and utility-scale projects by providing proposal creation, system design, procurement, or other services. However, unlike small installers, they do not normally install the solar systems themselves. Small installers handle residential systems, which do not require complicated system designs.

For small system installers, the environmental attributes may be aggregated. Small environmental attributes can be aggregated into a large group of environmental attributes to be traded. For example, in New Jersey, the solar system vendor contacts all the solar system vendor's system owners and negotiates with the owners to sell their environmental attributes at a proposed price. The environmental attributes may be aggregated in the solar system vendor's account, for example in online account. Once aggregation takes place, the solar system vendor will trade the environmental attributes with the interested utilities. Thus, the solar system vendor is able to offer the environmental attribute sales contract to the system owners at the time of system sale.

The solar system vendor 170 sells the environmental attributes to both the compliance market 520 and the voluntary market 530. The compliance market is comprised of entities that are required by laws and regulations to purchase a percentage of their energy portfolio from renewable sources. These entities may include utilities that are subject to renewable portion standards (RPS) regulations. The voluntary market is comprised of entities that choose to purchase environmental attributes, but are not required to do so by laws or regulations. For example, corporations might purchase environmental attributes and include such information on their financial disclosures or statements in order to increase brand awareness. Non-governmental institutions (NGOs) or other participants may voluntarily purchase environmental attributes for ideological reasons. Thus, there is a demand for environmental attributes in both the voluntary and compliance markets.

In the compliance market, there are states with solar carve-outs, which are a mandated percentage of solar electricity generation within a renewable portfolio standard. Direct sales are possible in states with solar carve outs. In a direct sale, the solar system vendor may request the state public utilities commission (PUC)/environmental attribute administrator 580 to issue a certification for the sale of the environmental attribute. If the environmental attribute is certified, the environmental attribute buyer 590 will issue a payment to the solar system vendor 170. In New Jersey, the state PUC sets the equation to measure the amount of environmental attributes produced by certain system size, which is only applicable for systems below, for example, 10 kW. For larger systems, the state only typically approves environmental attributes from the actually measured electric amount. (For example, 1 MWh=1 REC). In states without solar carve-outs, environmental attribute brokers 505 may operate as intermediaries between the solar system vendor 170 and the environmental attribute buyer 515. The environmental attribute brokers 505 typically receive a commission payment for their services.

On the voluntary market 530, third-party certifiers 525 typically issue a certification for the sale of the environmental attribute. The third-party certifiers usually receive a fee payment from the solar system vendor 170. Sales on the voluntary market typically take place through a broker, who receives a commission payment from the solar system vendor for brokering the sale to environmental attribute buyer 545. Environmental attribute buyers in the voluntary market include utilities with green power requirements, or institutions and companies with a voluntary renewable portfolio standard (RPS), which is a mandated amount of renewable energy traded by utilities.

Figure 5:
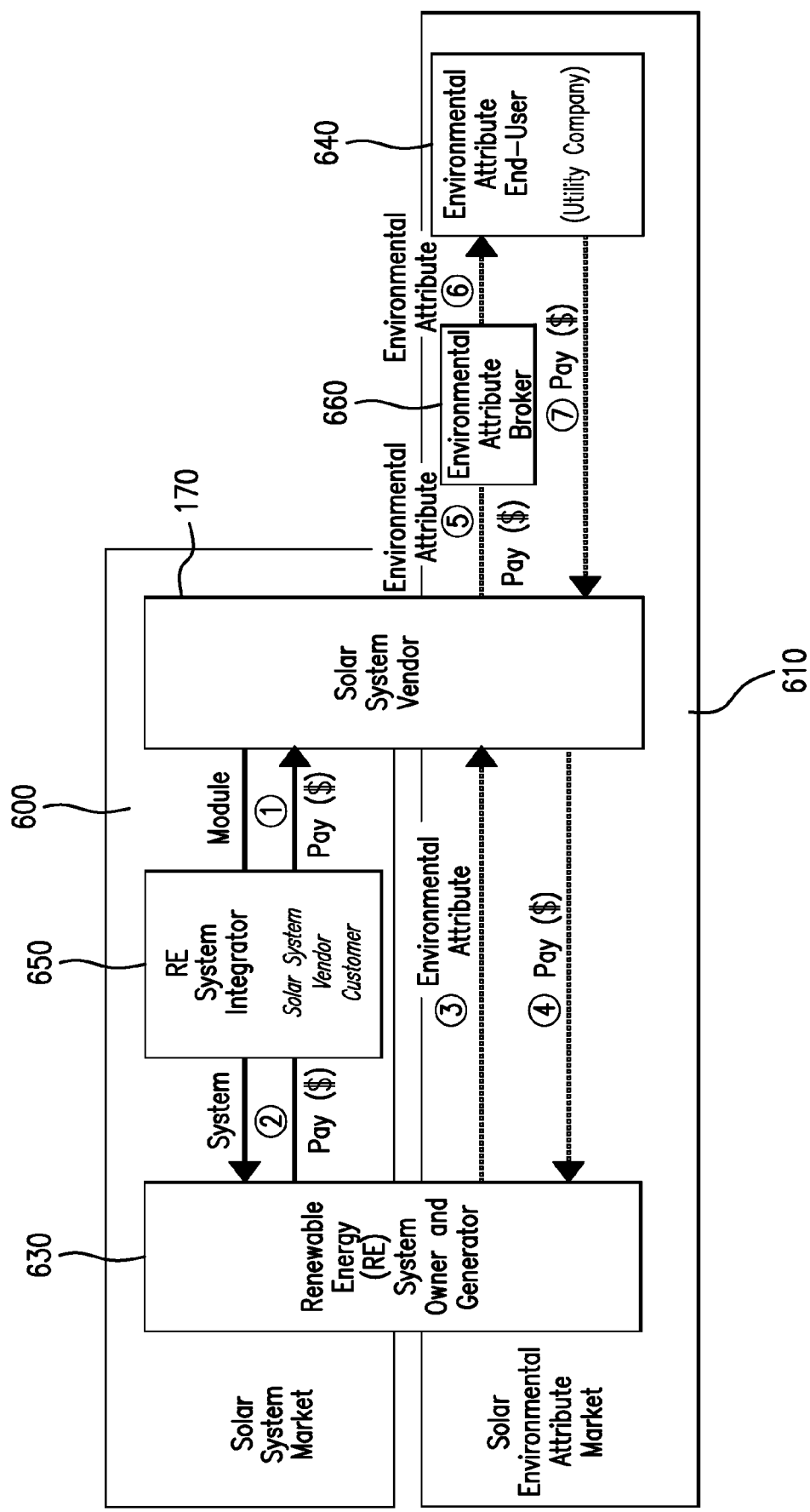
FIG. 5 shows the interaction between participants in the solar system model and solar environmental attribute market.
Figure 6:
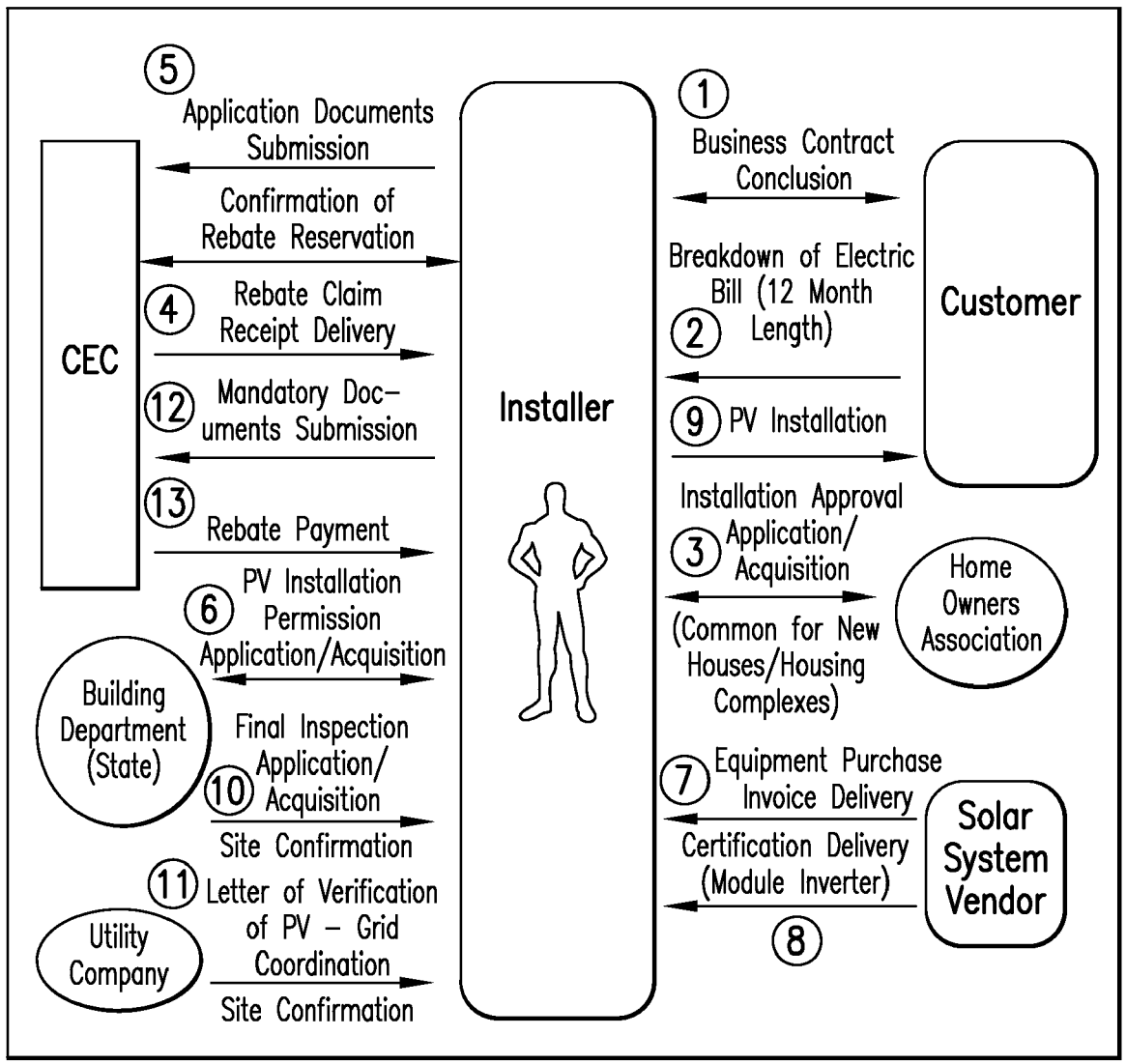
FIG. 6 shows the relationship between the solar system installer and other entities.

FIG. 5 shows payment and environmental attribute transfer activity of stakeholders in the solar system and solar environmental attribute markets. Stakeholders include a renewable energy (RE) system owner and generator 630, RE system integrator 650, solar system vendor 170, and a environmental attribute end-user 640. The RE system integrator 650 may be a customer of the solar system vendor, and the environmental attribute end-user 640 might be a utility company. Both the RE system owner and generator 630, and the solar system vendor 170 are active in the solar system market 600 and the solar environmental attribute market 610. The RE system integrator 650 is active in only the solar system market, and the environmental attribute end-user 640 is active in only the solar environmental attribute market.

In the solar system market 600, the RE system owner and generator 630 pays the RE system integrator 650 and receives from the RE system integrator a solar system. The RE system integrator 650 pays the solar system vendor 170 and receives from the vendor a solar module. In the solar environmental attribute market 610, the environmental attribute is transferred from the RE system owner and generator 630 to the solar system vendor 170, and payment is made from the solar system vendor to the RE system owner and generator. Having received the environmental attribute from the RE system owner and generator, the solar system vendor transfers the environmental attribute to the environmental attribute end user 640 using the services of a environmental attribute broker 660. The environmental attribute broker 660 receives a commission payment from the solar system vendor, and the solar system vendor receives a payment from the environmental attribute end user 640.

Figure 7:
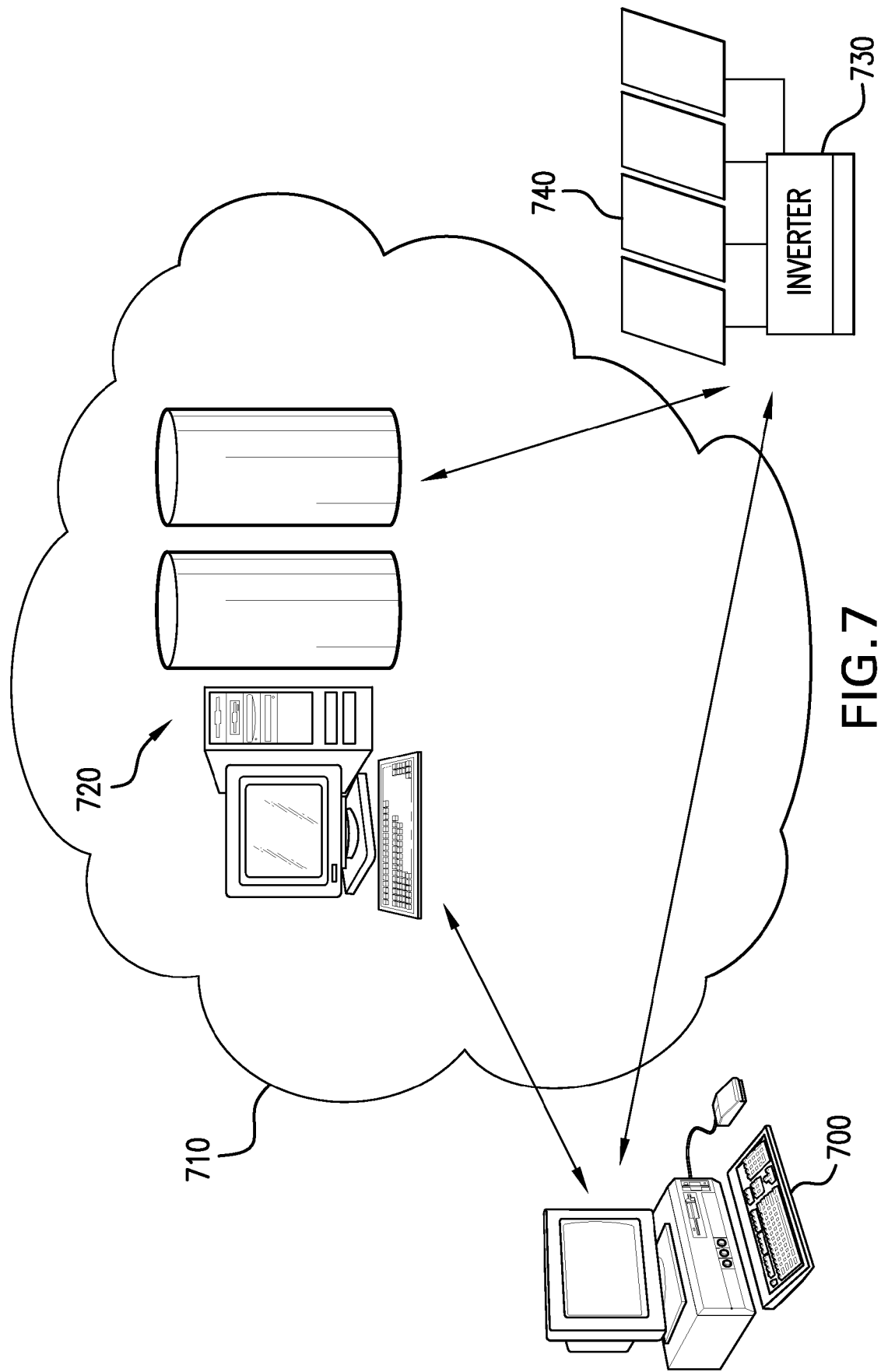
FIG. 7 shows the solar system integrated into a network monitoring system.

As shown in FIG. 7, in an optional aspect of the solar system, the inverter may be connected to a network monitoring system and monitored remotely by either the solar system vendor or other party capable of monitoring the status of the customer's system. This network monitoring system can provide performance monitoring or operations and management (O&M) service to solar system customers.

The primary components of the network monitoring system include the inverter 730 connected to the solar modules 740, the monitoring server 720, and the monitoring client 700. The inverter 730, monitoring server 720, and monitoring client 700 are connected via a computer network 710, which may be wired or wireless. The inverter 730 may also be connected to the monitoring client directly through a computer network, which may be the same or different from the computer network 710 that connects the inverter 730, the monitoring server 720, and the monitoring client 700. An IP address or other addressing scheme may be used to identify and direct traffic to the components of the system.

The networking monitoring system is configured to monitor primarily the output of inverter 730. The inverter 730 converts direct current generated by the solar modules 740 into alternating current capable of powering appliances in the home. As such, the inverter 730 is the source of important information about the status of the solar system. This information may include the AC output, DC input, error messages, and accumulated output over a given period of time, such as a month, year, or lifetime of the system.

The monitoring server 720 collects performance information for each solar system on the network, processes the data as needed, and provides the information to the monitoring client 700. The benefits of such a model are that the monitoring server 720 may manage multiple systems at once, and, on the monitoring server 720 side, useful information such as historical and environmental data can be searched and incorporated into the information provided to the customers. It is also possible to add services such as display page layout and automatic alerts in the case of system errors.

The various components are connected and managed via hardware and software protocols such as SMTP, HTML, TCP-IP, and SNMP. ASP or other server technology may be used to control applications running on the monitoring server 720. In addition, a database on the monitoring server 720 may be used to store and track information from the customers, many of whom may be linked to a single server. The monitoring client 700 may deploy client-side applications, such as an internet browser, specialized browsers compatible with SNMP (such as OPENVIEW), standard email client software, or custom-developed software. The monitoring device could be equipped with an HTML homepage display capability or an SMTP email server, which allows users to access the information via an HTML browser by inputting the URL or IP address of the equipment. The monitoring device can send emails to specific users to provide information.

In some cases or regions, the solar system customers may be asked to transfer environmental attributes to the solar system vendor in exchange for providing the network monitoring function. This allows the solar system customers to receive the network monitoring function at little or no additional cost, if they agree to sell future environmental attributes to the solar system vendor. After the actual transfer of the environmental attribute, the solar system vendor will receive a portion of the revenue and may then transfer the rest to the solar system customer. Providing this valuable service in exchange for environmental attributes provides a competitive advantage to the solar system vendor.

Without departing from the spirit and scope of this invention, one of ordinary skill in the art can make various changes and modifications to the present invention to adapt it to various uses and conditions. As such, these changes and modifications properly fall within the scope of the invention.

The invention claimed is:

1. A method of delivering a solar system and related services from a solar system vendor to a customer, comprising:
providing a sales lead that includes estimated requirements to a contractor, the contractor contacting the customer to perform a sales close, ordering solar system products from the solar system vendor, and issuing a payment for the products to the solar system vendor; financing the solar system by:
providing a loan from a financial institution to the customer, providing periodic payments from the customer to the financial institution, and providing payments from the financial institution to the contractor and from the contractor to the solar system vendor; and
issuing a government rebate to the customer upon purchase of the solar system, where the rebate is provided as whole or part collateral to the financial institution, allowing the customer to more readily finance the purchase of a solar system.

2. A method of delivering a solar system and related services from a solar system vendor to a customer, comprising:
financing the solar system by providing a loan from a financial institution to the customer, providing periodic payments from the customer to the financial institution, and providing payments from the financial institution to the contractor and from the contractor to the solar system vendor;
issuing a government rebate to the customer upon purchase of the solar system, where the rebate is provided as whole or part collateral to the financial institution, allowing the customer to more readily finance the purchase of a solar system;
transferring environmental attributes from the customer to the solar system vendor, and transferring environmental attributes from the solar system vendor to members of the voluntary or compliance markets; and
aggregating the environmental attributes in a solar system vendor's account where they are traded either individually or in the aggregate with interested members of the voluntary or compliance markets; and
providing a rebate to the customer in exchange for the transfer of the environmental attribute.

3. A method of delivering a solar system and related services from a solar system vendor to a customer, comprising:
financing the solar system by providing a loan from a financial institution to the customer, providing periodic payments from the customer to the financial institution, and providing payments from the financial institution to the contractor and from the contractor to the solar system vendor; and
issuing a government rebate to the customer upon purchase of the solar system, where the rebate is provided as whole or part collateral to the financial institution, allowing the customer to more readily finance the purchase of a solar system,
wherein the components of the solar system include solar modules, an inverter, and a meter.

\* \* \* \* \*